Figure 1:
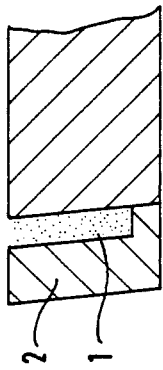

United States Patent [19]

Gramberger

[11] Patent Number: 4,940,847
[45] Date of Patent: * Jul. 10, 1990

[54] METHOD FOR MANUFACTURING A FRICTION RING HAVING A CONICAL OR CYLINDRICAL FRICTION SURFACE

[75] Inventor: Johann Gramberger, Wolfsegg, Austria

[73] Assignees: ZWN Zahnradwerk Neuenstein GmbH, Neuenstein, Fed. Rep. of Germany; Miba Sinter, Laakirchen, Austria

[ * ] Notice: The portion of the term of this patent subsequent to Apr. 17, 2007 has been disclaimed.

[21] Appl. No.: 157,646

[22] Filed: Feb. 18, 1988

[30] Foreign Application Priority Data

Feb. 21, 1987 [DE] Fed. Rep. of Germany ....... 3705660

[51] Int. Cl.⁵ ............................................. B32B 18/00
[52] U.S. Cl. .................... 156/89; 192/107 M; 264/60; 264/62; 156/245; 156/293
[58] Field of Search ............... 156/89, 245, 293, 294; 428/181, 239, 279, 287; 264/60, 62; 228/120, 122, 903; 29/527.4; 192/53 F, 107 M; 419/5, 8

[56] References Cited

U.S. PATENT DOCUMENTS

| | | | |
|---|---|---|---|
| 2,784,112 | 3/1957 | Nicholson | 264/60 |
| 3,034,860 | 6/1962 | Masterson et al. | 192/107 M |
| 3,137,602 | 6/1964 | Lincoln | 264/60 |
| 3,239,323 | 3/1966 | Folweiler | 156/89 |
| 3,306,401 | 2/1967 | Dasse | 188/251 |
| 3,370,947 | 2/1968 | Talmage | 419/8 |
| 3,698,526 | 10/1972 | Berges | 192/107 M |

FOREIGN PATENT DOCUMENTS

742954 9/1966 Canada .................. 156/89
3637386 11/1986 Fed. Rep. of Germany .

*Primary Examiner*—Caleb Weston

[57] ABSTRACT

In order to enable a friction ring comprising a supporting ring and a sintered friction lining to be produced without sintering the friction lining to an intermediate carrier, one initially forms a self-supporting moulded ring (7) from a compacted dry powder material (1), by pre-sintering or bonding using a bonding agent, whereafter the moulded ring is pressed into the supporting ring and the friction lining is produced by final sintering.

20 Claims, 2 Drawing Sheets

METHOD FOR MANUFACTURING A FRICTION RING HAVING A CONICAL OR CYLINDRICAL FRICTION SURFACE

The present invention relates to a method for manufacturing a friction ring having a conical or cylindrical friction surface, in which a friction lining that has been pre-fabricated from a sintering powder material is connected with a supporting ring.

The pores encountered in the material of sintered bodies provide certain advantages when such bodies are used for the manufacture of friction linings. In the case of friction discs having a plane friction surface, one can profit of these advantages easily because the dry powder, which consists of several components, can be exactly metered out upon the disc body and then sintered and compacted by a series of procedural steps. The sintering process leads in this case to a solid bond between the friction lining and the disc body. However, friction locking rings of the type used in synchronizing mechanisms of manual transmissions, friction clutches or friction brakes, are usually not provided with friction linings consisting of a sintered material because the process of applying the dry powder upon the cylindrical or conical friction surface is already connected with problems and because it is not possible to compact the powder layer by an axially moving pressure piston.

In order to enable friction locking rings to be nevertheless provided with the sintered friction lining, it has been previously known (German Patent Specification No. 34 17 813) to sinter the friction lining in the conventional manner upon a plane carrier sheet, to bend the carrier sheet thereafter to adapt it to the geometric shape of the friction surface of the friction ring, and to connect it thereafter with the supporting ring by spot-welding. However, it is a drawback of these known friction rings that the spot-welding process leads to non-uniform thermal loading of the supporting ring, with the consequential risk of thermal stresses, that the friction lining cannot be reworked exactly between the welding points due to the resilience of the carrier sheet and that no close production tolerances can be observed in practice because for a given dimension of the supporting ring the thickness of the sintered material is reduced by the thickness of the carrier sheet. In addition, the operation of shaping the initially plane carrier sheet may impair the connection between the carrier sheet and the friction lining sintered upon the latter.

Now, it is the object of the present invention to avoid these drawbacks and to provide a method for manufacturing a friction ring of the type described above by which the supporting ring can be provided in a simple manner with a sintered friction lining, without there being a need for applying the sintered material upon a separate carrier and connecting the latter thereafter with the supporting ring.

This object is achieved according to the invention by the steps of forming initially at least one self-supporting shaped strip capable of being subjected to pressure, by pre-sintering or bonding using a bonding agent, pressing the shaped strip into the supporting ring, and producing the friction lining thereafter by sintering.

Due to the fact that a self-supporting shaped strip exhibiting the necessary strength for the further processing steps is produced from a pre-determined amount of dry powder by sintering or bonding using a bonding agent, no separate carrier sheet is required for the manufacture of the friction lining and the shaped strip that has been pre-fabricated from the dry powder can be pressed directly into the supporting ring and sintered together with the latter while being in intimate contact therewith. The pre-fabrication of a shaped ring eliminates in addition the need for subjecting the friction lining subsequently to major shaping operations so that one need not fear that the load-carrying strength of either the friction lining or the connection between the friction lining and the supporting ring may be impaired subsequently by such a shaping operation. Rather, one obtains a full-surface connection between the friction lining and the supporting ring which does not only withstand all stresses to which it may be exposed, but which in addition avoids any resilience of the type heretofore encountered between the connection points, and this leads directly to improved production tolerances during reworking of the frictional surface. In addition, when determining the thickness of the friction lining, it is no longer necessary to allow for the thickness of the carrier sheet so that a correspondingly greater thickness of the dry powder layer can be selected for the production of the self-supporting shaped strip. This permits the density of the dry powder material and, consequently, its porosity to be controlled with much greater accuracy. In addition, working displacement grooves for a lubricant into the friction lining is also rendered easier when the latter offers increased thickness.

For producing the self-supporting moulded rings, the dry powder intended for making the friction lining may be introduced into a corresponding mould and compacted. Another possibility would be to produce the moulded ring by extrusion. In both cases, the powder may be pre-sintered after the moulding process so that a self-supporting body is obtained which exhibits the necessary strength for further treatment. However, it is also possible for this purpose to bond the dry powder by means of a suitable bonding agent so as to obtain a body of stable shape, it being the only object of this operation to obtain a moulded body that can be pressed into the supporting ring prior to the sintering operation proper and that exhibits the desired density.

A method which is particularly well suited for mass production consists in extruding the dry powder intended to make up the friction lining into the shape of a tube and separating from this tube the individual shaped rings after the pre-sintering process; such a production method makes it largely possible to produce the shaped rings continuously.

Figure 2:
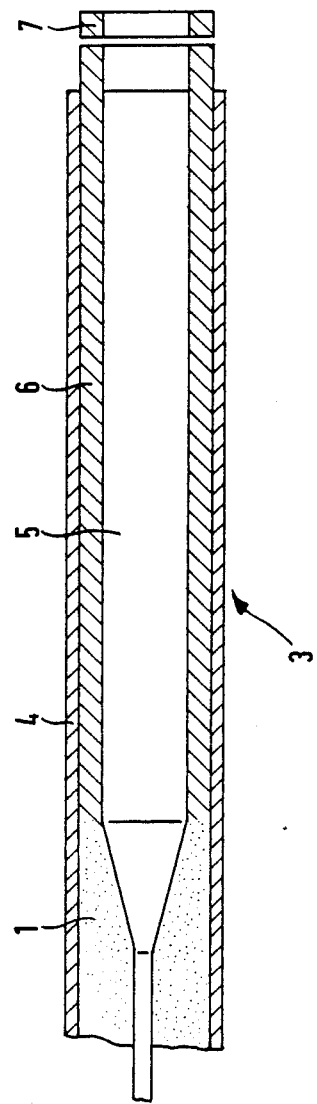

The method according to the invention for manufacturing a friction ring having a conical or cylindrical friction surface will now be described in greater detail with reference to the drawing in which FIG. 1 shows a diagrammatic axial cross-section through a section of a mould for producing a shaped ring; and FIG. 2 shows a diagrammatic cross-section through an extruder for producing a shaped ring from the dry powder material.

Figure 3:
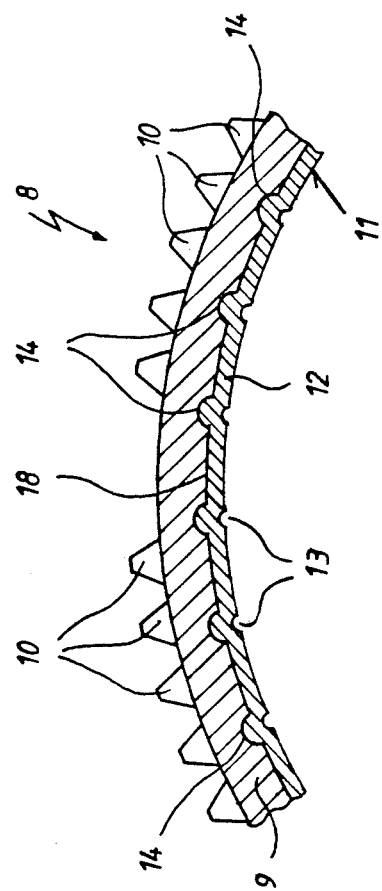

FIG. 3 shows a cross-sectional view through a portion of a synchronizing ring as manufactured according to the invention.

In order to provide a supporting ring with a friction lining consisting of a powder material, one initially produces a self-supporting shaped ring consisting of a powder material and exhibiting sufficient strength to enable the shaped ring to be pressed into a supporting ring. To this end, the dry powder mixture 1 from which the friction lining is to be made is supplied into a mould 2 and given the desired shape by compression moulding. The desired inherent strenth of the shaped ring is ensured by pre-sintering or by bonding the dry powder by means of a bonding agent. After removal from the mould, the shaped ring is pressed into the supporting ring and sintered whereby a full-surface intimate connection is obtained between the shaped ring forming the friction lining and the supporting ring. If the supporting ring is likewise made from a powder material, the friction lining and the supporting ring may be sintered together.

Another possibility of producing self-supporting shaped rings consists in moulding the prepared dry powder 1 in an extruder 3 consisting of an outer tube 4 and a core 5 inserted in the tube 4 at an annular distance therefrom. By means of a moulding die—not shown in the drawing—one then compacts the dry powder 1 in the annular space between the tube 4 and the core 5 so that the material leaves the extruder 3 in the form of an extruded tube 6 from which the individual shaped rings 7 can be cut off. The necessary load-carrying strength of the extruded tube 6 can be obtained again by pre-sintering the dry powder in this compressed tubular form or by bonding the powder in the tubular shape by means of an added bonding agent.

The heat treatment required for pre-sintering the tube 6 may be effected while the extruded tube is fed through the tube 4 of the extruder 3. And if a bonding agent has been added, this can also cure sufficiently during the time in which the extruded tube is fed through the tube 4 of the extruder.

If the shaped rings to be produced are not cylindrical, but conical, then the shaped rings originally produced in a cylindrical form may be expanded subsequently to a conical shape. If the tube 4 and the core 5 of the extruder 3 are enlarged conically in the area where the extruded tube 6 leaves the extruder, conical rings may even be produced directly by the extrusion process, by cutting the individual shaped rings off the extruded tube 6 directly as the extruded tube 6 leaves the extruder 3.

FIG. 3 shows a diagrammatic cross-sectional view through a portion of a synchronizing ring as manufactured according to the invention.

The synchronizing ring 8 mainly consists of a supporting ring 9 made of metal or of a sinter powder material. The supporting ring 9 is provided with teeth at an outer circumferential surface whereas an inner circumferential surface 11 is made as a frictional surface. Preferably, frictional surface 11 is of conical shape but can be of cylindrical shape, too. Further, it goes without saying that the synchronizing ring 8 could be provided with teeth at an inner circumferential surface and with a frictional surface at an outer circumferential surface, or both inner and outer circumferential surfaces could each be provided with axially displaced frictional surfaces and teeth without departing from the scope of the present invention.

In the embodiment of the invention, shown in FIG. 3, the supporting ring 9 is provided with a ring-shaped frictional body 12 as manufactured according to the above method as explained in FIGS. 1 and 2. Frictional body 12 may be provided with depressions 13 at an inner circumferential surface and with further depressions 14 at an outer circumferential surface or adjoining surface 18, mating with corresponding depressions in supporting ring 9 to still enhance mechanical stability in a circumferential direction. Depressions 13 may be used to guide lubricating oil.

I claim:

1. A method for manufacturing a frictional ring having a circumferential frictional surface, the method comprising the steps of:

manufacturing a ring-shaped supporting member having a first circumferential supporting surface;

moulding and compressing a sintering powder to provide a ring-shaped sinter powder member having a second circumferential supporting surface complementary to said first circumferential supporting surface;

pre-sintering said sinter powder member to provide a self-supporting mechanically stable friction member;

pressing said friction member into said supporting member with said first and second circumferential supporting surfaces adjoining each other;

sintering said friction member with said second circumferential supporting surface onto said first circumferential supporting surface of said supporting member.

2. The method of claim 1, wherein said circumferential frictional surface is of conical shape.

3. The method of claim 1, wherein said circumferential frictional surface is of cylindrical shape.

4. The method of claim 1, wherein said circumferential frictional surface is an outer circumferential surface.

5. The method of claim 1, wherein said circumferential frictional surface is an inner circumferential surface.

6. The method of claim 1, wherein said step of moulding and compressing said sintering powder comprises the step of filling said sintering powder into a ring-shaped mould and compacting said sintering powder therein.

7. A method for manufacturing a frictional ring having a circumferential frictional surface, the method comprising the steps of:

manufacturing a ring-shaped supporting member having a first circumferential supporting surface;

extruding a sintering powder to provide a ring-shaped sinter powder member having a second circumferential supporting surface complementary to said first circumferential supporting surface;

bonding said sinter powder member by applying a bonding agent to said sinter powder member to provide a self-supporting mechanically stable friction member;

pressing said friction member into said supporting member with said first and second circumferential supporting surfaces adjoining each other; and sintering said friction member with said second circumferential supporting surface onto said first circumferential supporting surface of said supporting member.

8. A method for manufacturing a frictional ring having a circumferential frictional surface, the method comprising the steps of:

manufacturing a ring-shaped supporting member having a first circumferential supporting surface;

moulding and compressing a sintering powder to provide a ring-shaped sinter powder member having a second circumferential supporting surface complimentary to said first circumferential supporting surface;

bonding said sinter powder member by applying a bonding agent to said sinter powder member to provide a self-supporting mechanically stable friction member;

pressing said friction member into said supporting member with said first and second circumferential supporting surfaces adjoining each other;

sintering said friction member with said second circumferential supporting surface onto said first circumferential supporting surface of said supporting member.

9. The method of claim 8, wherein said step of bonding said sintering powder comprises the step of extruding said sintering powder to form a tube, pre-sintering said tube and cutting off ring-shaped slices from said extruded and pre-sintered tube thereafter.

10. The method of claim 8, wherein said circumferential frictional surface is of conical shape.

11. The method of claim 8, wherein said circumferential frictional surface is of cylindrical shape.

12. The method of claim 8, wherein said circumferential frictional surface is an outer circumferential surface.

13. The method of claim 8, wherein said circumferential frictional surface is an inner circumferential surface.

14. The method of claim 8, wherein said step of moulding and compressing said sintering powder comprises the step of filling said sintering powder into a ring-shaped mould and compacting said sintering powder therein.

15. A method for manufacturing a frictional ring having a circumferential frictional surface, the method comprising the steps of:

manufacturing a ring-shaped supporting member having a first circumferential supporting surface;

extruding a sintering powder to provide a ring-shaped sinter powder member having a second circumferential supporting surface complementary to said first circumferential supporting surface;

pre-sintering said sinter powder member to provide a self-supporting mechanically stable friction member;

pressing said friction member into said supporting member with said first and second circumferential supporting surfaces adjoining each other; and sintering said friction member with said second circumferential supporting surface onto said first circumferential supporting surface of said supporting member.

16. The method of claim 15, wherein said circumferential frictional surface is an outer circumferential surface.

17. The method of claim 15, wherein said circumferential frictional surface is an inner circumferential surface.

18. The method of claim 15, wherein said step of extruding said sintering powder comprises the steps of extruding said sintering powder to form a tube, pre-sintering said tube and cutting off ring-shaped slices from said extruded and pre-sintered tube thereafter.

19. The method of claim 15, wherein said circumferential frictional surface is of conical shape.

20. The method of claim 15, wherein said circumferential frictional surface is of cylindrical shape.

* * * * *